Figure 1:
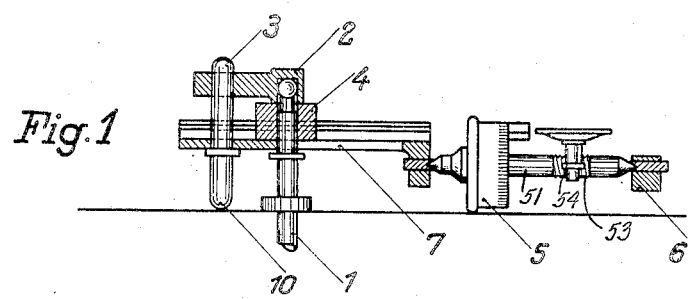
Figure 3:
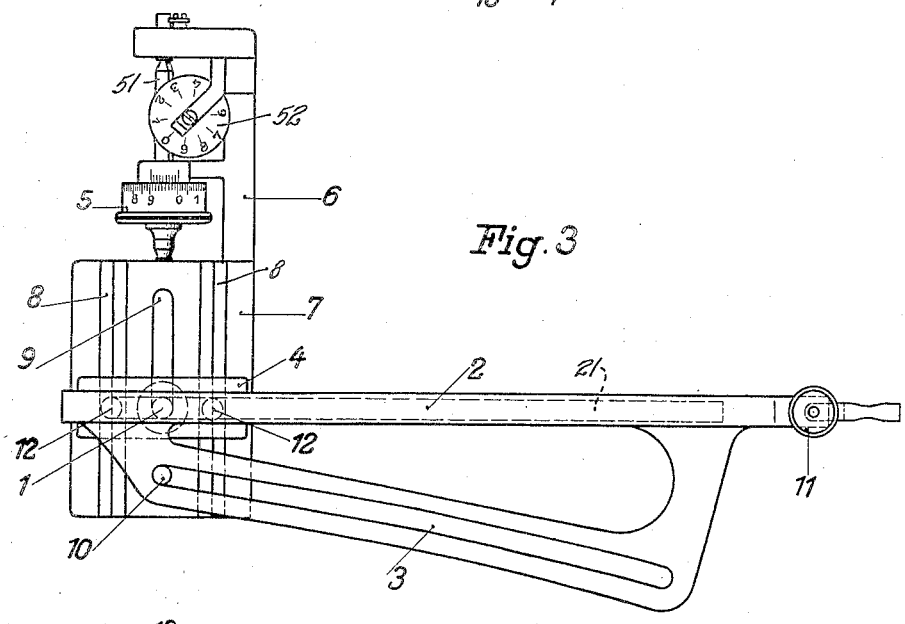
Figure 2:
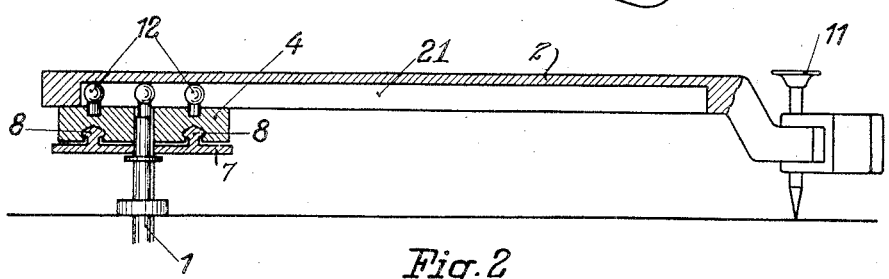

Nov. 15, 1932.  E. GUMAN  1,887,593

MECHANICAL INTEGRATING INSTRUMENT

Filed March 12, 1930   2 Sheets-Sheet 1

Inventor:
E. Guman
By: Marks & Clerk
Attys

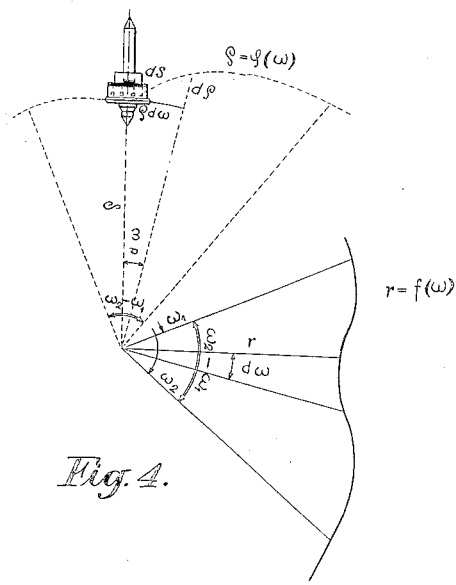
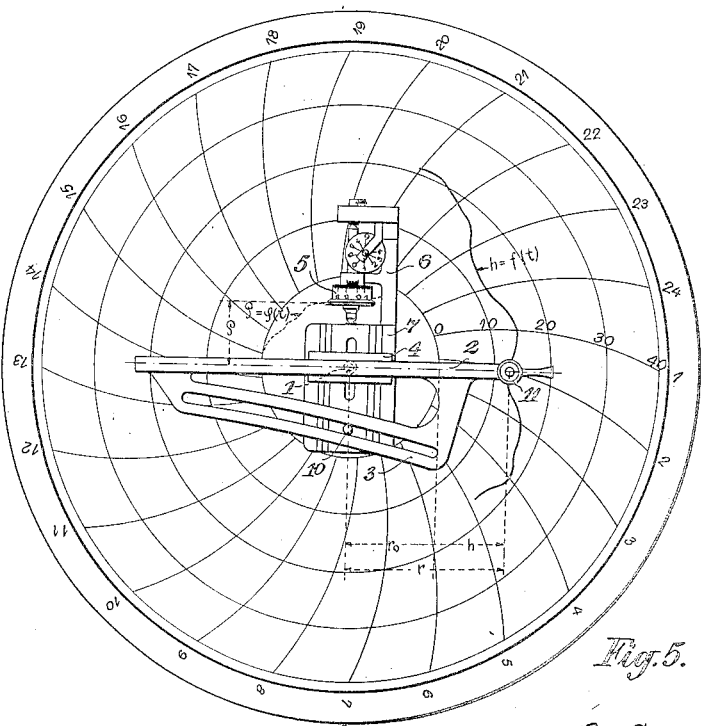

UNITED STATES PATENT OFFICE

EUGENE GUMAN, OF MEDIAS, RUMANIA

MECHANICAL INTEGRATING INSTRUMENT

Application filed March 12, 1930, Serial No. 435,307, and in Rumania March 19, 1929.

This invention relates to mechanical integrators of the planimeter type having a measuring wheel and a tracing point.

The object of the present invention is to provide a mechanical integrator of the type referred to for computing mechanically recorded or otherwise plotted diagrams and adapted to integrate automatically a function $\varphi(x)$ when the tracing point is moved over a curve $f(x)$, there being a definite algebraical or geometrical relation between $\varphi(x)$ and $f(x)$.

The integrator can be used for many technical calculations, for example the calculation of the amount of flow of a material by the differential pressure method, which shall hereinafter be more particularly described as one possible application of the instrument.

The liquid or gas flowing through an aperture suffers a drop in pressure which is in a definite algebraical relation to the quantity of liquid flowing through the aperture, which is to say, the quantity of liquid is directly proportional to the square root of the pressure difference, in so far as this pressure difference does not exceed a definite limit, which is always the case, if $$V = c\sqrt{hP},$$

P being the pressure head, V being the quantity of liquid flowing through in unit time, c a constant depending on the nature of the liquid and the dimensions of the measuring apparatus and $h$ the pressure difference.

In most cases in commercial gas measurement, the flow meter is placed after a pressure regulator and the gauge or line pressure recorded on the diagram can be considered as constant, so that the quantity $\sqrt{P}$ can be eliminated by multiplying it by $c$, thus $$c\sqrt{hP} = c\sqrt{P} \times \sqrt{h} = C\sqrt{h}$$

For a continuous measurement the pressure difference is automatically plotted on a diagram sheet by means of a registering pressure gauge as a function of time: $h = f(t)$.
The quantity of liquid which will have flowed through in the period of time $t_2 - t_1$ will be:

$$\int_{t_1}^{t_2} V dt = C \int_{t_1}^{t_2} \sqrt{h \cdot dt}$$

A correct integration of the right hand side of the above equation could not be carried out from the $h = f(t)$ diagram by the hitherto known methods. With the integrator this integration can be carried out automatically by tracing the original diagram, the figure read off on the integrator when multiplied by the coefficient giving the quantity of liquid which has flowed through.
The accompanying drawings show an integrator intended for polar diagrams and just for the above example. Thus, by tracing the function $h = f(t)$ the following integral is automatically formed:

$$I = \int_{t_1}^{t_2} \sqrt{h \cdot dt}$$

Referring to the drawings, 1 is a centering pivot fastened on a plane base of any known kind, such as a drawing board for example, and having a circular part fitting in a center hole of the diagram chart, a neck fitting in a slot 9 of a plate 7, and a ball-shaped head fitting in a U-groove 21 extending lengthwise of a tracing arm 2 carrying the tracing pin 11 and having a laterally offset portion in which is formed a slot 3 which is curved in accordance with the function $\varphi$. The plate 7 has an extension frame 6 in which is journalled on centers the measuring wheel 5, the plate 7 being also provided with guide ribs 8, slot 9 and a guide pin 10. The longitudinal axis of the shaft 51 of the measuring wheel and of the slot 9 lie in the same straight line which intersects the longitudinal axis of the pin 10 and the guide ribs 8 are parallel to this line.

A slide 4 having on its under side two grooves fitting slidably over the guide ribs 8 and having on its upper side two locating pins 12 with ball shaped heads fitting slidably in the groove 21 of the tracing arm 2, is perforated at its center to receive the neck of the centering pivot 1. By this means, the slide 4 connects the tracing arm 2 with the measuring wheel in a movable manner.

The centering pivot 1 is fixed at the center of the polar co-ordinate system of the diagram to be computed. Over it is placed the plate 7 with the slide 4 with the neck of the centering pivot passed through the slot 9 and center hole of the slide 4. The locating pins 12 and the centering pivot 1 lie in a straight line the ball-shaped heads perpendicular to the center line drawn through the intersection of the longitudinal axes of the guide pin 10 and centering pivot 1 and forming a continuation of the longitudinal axis of the measuring wheel 5. The tracing arm 2 is placed over the locating pins 12 and centering pivot 1 with its U-shaped groove 21 receiving the ball-shaped heads of the pins 12 and pivot 1, and the guide pin 10 is engaged in the slot 3. The arm 2 is maintained by the locating pins 12 and the centering pivot 1 with the groove 21 perpendicular to the longitudinal axes of the measuring wheel and the slot 9. The integrator is operated by placing the tracing pin 11 over the curve recorded or plotted on the diagram and moving the tracing pin over the curve. The tracing arm 2 can only move over the centering pivot 1, the end of which engages in the U-shaped groove of the tracing arm 2, the motion being either in the direction of the longitudinal axis of the slot 21 or around the centering pivot. During the turning motion of the tracing arm 2, the slide 4 is also turned, together with the plate, 7, the frame 6 and the measuring wheel 5, which are carried around by the said slide.

Referring to Figure 4, on the tracing pin 11 being moved over a portion of the curve $r = f(\omega)$ between the radius vectors $\omega_1$ and $\omega_2$, the axis of the measuring wheel 5 will be angularly displaced by an equal amount round the centering pivot 1, the axis of which passes through the center of the polar co-ordinate system of the curve. As the tracing point is made to follow the undulations of the curve the arm 2 slides over the ball ends of the pins 12 and the pin 10 in the slot 3 is moved radially by the slot 3, together with the slide 7 and measuring wheel 5, the point of contact of the latter with the paper moving along a path represented by the curve $\rho = \varphi(\omega)$, where $\rho$ is the radius vector of this curve.

Between $r$ and $\rho$ there is a known relation $\rho = \psi(r)$.

Considering for the moment only the angular displacement of the measuring wheel through a small angle $d\omega$, during this movement the measuring wheel rolls over the dotted line $d_5$, which can be resolved into two components, namely a tangential component $d\omega$ perpendicular to the radius vector and a radial component $d\rho$ in the direction of the radius vector. The axis of the measuring wheel coincides with the radius vector $\rho$, so that the measuring wheel in moving through the very small angle $d\omega$ rolls tangentially a distance $\rho \, d\omega$ but in the direction $d\rho$ only slides radially. It will be seen therefore that only the tangential component will actually be registered by the measuring wheel, that is to say the measuring wheel, during the movement of the tracing point from $\omega_1$ to $\omega_2$ will integrate the value of $$\int_{\omega_1}^{\omega_2} \rho \, d\omega$$

which, substituting the value of $\rho = \psi(r)$, becomes $$\int_{\omega_1}^{\omega_2} \psi(r) \, d\omega,$$

which is the derived function of the curve $r = f(\omega)$ which is to be computed.

The distance $\rho$ of the measuring wheel 5 from the centering pivot 1 must be so adjusted by the pin 10 which travels in the slot 3 that the length $r$ of the tracing arm and the distance $\rho$ will be in the ratio $\rho = \psi(r)$.

Thus, the shape of the slot 3 must have the shape of a curve representing the relation between the plotted function $r$ and the desired function $\psi(r)$ thereof to be integrated. Thus, in the example illustrated, as the tracing point is moved over the curve of the function $r = f(\omega)$, the tracing wheel 5 will automatically integrate the instantaneous values of $\rho = \psi(r)$ and the integral can be simply read off on the counter provided on the measuring wheel.

With the integrator a series of curves 3 can be supplied with which the integrator can transform the integration of an unlimited number of different functions.

Taking the case of a flow meter diagram as a practical example, the simplified formula hereinbefore referred to being assumed, namely $$V = C\sqrt{h},$$

as the differential pressure varies widely according to the consumption this formula is applicable only for a period of differential time where the differential pressure can be considered as invariable $$dV = C\sqrt{h \cdot dt}$$

and the correct quantity of flow in the interval of time $t_2 - t_1$ can be determined only by integrating this equation $$V_{12} = C \int_{t_1}^{t_2} \sqrt{h \cdot dt}$$

For determining this integral with the integrator reference is to be made to Figure 5, which shows the diagram chart of a flowmeter with the recorded differential pressure curve, the polar-angles numbered from 1 to 24, representing the hours, the differential pressure scale being graduated from 0 to 40 in inches of water. The static pressure curve is omitted, being comprised in flow co-efficient C. Let $r_0$ be the radius of the 0 circle, it will be seen that $h = r - r_0$.

The integrator, on moving the tracing point over the curve $h = f(t)$, will give the integral $$L = \int_{t_1}^{t_2} \psi(r) dt.$$

Following the contact point of the tracing wheel and diagram chart this will describe the imaginary curve $\rho = \varphi(t)$ shown with dotted line. In this case the relation between $r$ and $\rho$ must be the compound square root function $$\rho = \psi(r) = \sqrt{r - r_0}$$

and this substituted in the above integral gives $$L = \int_{t_1}^{t_2} \sqrt{r - r_0} \cdot dt$$

or with the value of $h$ $$L = \int_{t_1}^{t_2} \sqrt{h} \cdot dt.$$

But this is exactly the integral on the right hand side of the equation of $V_{12}$, thus $V_{12} = CL$ that is: the figure read off on the integrator multiplied by the flow co-efficient gives the correct quantity of fluid.

From this analysis is to be seen that the hourly method of computation widely used is not absolutely correct.

Further, it will be understood that the integrator described herewith shows only a practical example in a preferred form and it is obvious that modifications can be made without departing from the spirit of this invention or the scope of the claims. The integrating instrument is provided with a counter comprising a graduated disc 52 rotated by a worm wheel 54 from a worm 53 on the shaft of the measuring wheel 5.

What I claim is:

1. A mechanical integrating instrument for integrating a function of a plotted function comprising the combination with a centering pivot of a tracing arm rotatable and slidable on said centering pivot, a tracing member on said tracing arm, a measuring wheel supporting member rotatable and slidable on said centering pivot, a measuring wheel spindle having a measuring wheel thereon journalled in said supporting member guiding means on said supporting member in engagement with said tracing arm for maintaining the supporting member with the axis of the measuring wheel spindle in fixed angular relationship to a straight line intersecting the tracing member and the axis of the centering pivot, said guiding means being adapted to allow said supporting member and tracing arm to slide relatively to one another on the centering pivot in a radial direction and guiding means for controlling the radial displacement of the measuring wheel supporting member comprising a slotted guide on the tracing arm and a pin on the supporting member in engagement with the slot in said guide, said slot having the shape of a curve representing the relation between the plotted function and the function thereof to be integrated.

2. A mechanical integrating instrument for integrating a function of a plotted function comprising the combination with a centering pivot, of a tracing arm rotatable and slidable on said centering pivot, a tracing member on said tracing arm, a measuring wheel supporting member rotatable and slidable on said centering pivot, a measuring wheel spindle having a measuring wheel thereon journalled in said supporting member guiding means on said supporting member in engagement with said tracing arm for maintaining the supporting member with the axis of the measuring wheel spindle perpendicular to a straight line intersecting the tracing member and the axis of the centering pivot, said guiding means being adapted to allow said supporting member and tracing arm to slide relatively to one another on the centering pivot in a radial direction and guiding means for controlling the radial displacement of the measuring wheel supporting member comprising a slotted guide on the tracing arm and a pin on the supporting member in engagement with the slot in said guide, said slot having the shape of a curve representing the relation between the plotted function and the function thereof to be integrated.

3. A mechanical integrating instruction as set forth in claim 1, in which the guiding means for maintaining the measuring wheel supporting member with the axis of the measuring wheel spindle in fixed angular relationship to a straight line intersecting the tracing member and the axis of the centering pivot comprises a slide rotatable on the centering pivot and interposed between said supporting member and the tracing arm, said tracing arm having a longitudinal guide groove therein and said slide having fixed guide pins thereon in engagement with said groove, the measuring wheel supporting member having guiding means in engagement with said slide for guiding the said supporting member in the direction of the axis of the measuring spindle.

4. A mechanical integrating instrument as set forth in claim 1, in which the guiding means for maintaining the the measuring wheel supporting member with the axis of the measuring wheel spindle in fixed angular relationship to a straight line intersecting the tracing member and the axis of the centering pivot comprises a slide rotatable on the centering pivot and interposed between said supporting member and the tracing arm, said tracing arm having a longitudinal guide groove therein, and said slide having fixed guide pins thereon having ball heads in engagement with said groove, the measuring wheel supporting member having guiding means in engagement with said slide for guiding the said supporting member in the direction of the axis of the measuring spindle.

5. A mechanical integrating instrument as set forth in claim 1, in which the guiding means for maintaining the measuring wheel supporting member with the axis of the measuring wheel spindle in fixed angular relationship to a straight line intersecting the tracing member and the axis of the centering pivot comprises a slide rotatable on the centering pivot and interposed between said supporting member and the tracing arm, said tracing arm having a longitudinal guide groove therein, and said slide having fixed guide pins thereon in engagement with said groove, the measuring wheel supporting member having guide rails thereon parallel to the axis of the measuring wheel spindle and in slidable engagement with the said slide.

6. A mechanical integrating instrument as set forth in claim 1 having the tracing arm with the slotted guide thereon removably connected to the centering pivot so as to enable it to be replaced by another tracing arm having a slotted guide with a different shape.

7. A mechanical integrating instrument for computing orifice meter diagram charts, comprising the combination with a centering pivot of a tracing arm rotatable and slidable on said centering pivot, a tracing member on said tracing arm, a measuring wheel supporting member rotatable and slidable on said centering pivot, a measuring wheel spindle having a measuring wheel thereon journalled in said supporting member, guiding means on said supporting member in engagement with said tracing arm for maintaining the supporting member with the axis of the measuring wheel spindle in fixed angular relationship to a straight line intersecting the tracing member and the axis of the centering pivot, said guiding means being adapted to allow said supporting member and tracing arm to slide relatively to one another on the centering pivot in a radial direction and guiding means for controlling the radial displacement of the measuring wheel supporting member comprising a slotted guide on the tracing arm and a pin on the supporting member in engagement with the slot in said guide, said slot having the shape of a curve representing the relation between the plotted function and the square root function of the plotted diagram.

In testimony whereof I have signed my name to this specification.

EUGENE GUMAN.